United States Patent

[11] 3,579,756

[72] Inventor Leonid Mikhailovich Gurevich
ulitsa Gor Kogo,5,kv.4, Moscow, U.S.S.R.
[21] Appl. No. 820,912
[22] Filed May 1, 1969
[45] Patented May 25, 1971

[54] DEVICE TO FACILITATE REMOVAL OF ASBESTOS-CEMENT PIPES FROM THE MANDREL IN A PLANT FOR MANUFACTURE OF SUCH PIPES
2 Claims, 1 Drawing Fig.
[52] U.S. Cl. ............................................. 25/30,
249/68, 164/404, 18/2
[51] Int. Cl. ............................................. B28b 21/42
[50] Field of Search ............................................. 25/31, 15,
16, 84, 120, 30 (R); 249/66, 67, 68; 164/404; 18/2 (NM)

[56] References Cited
UNITED STATES PATENTS
2,292,866 8/1942 Cann ........................... 25/30

2,663,063 12/1953 Van Loon ................... 25/120(UX)
2,940,119 6/1960 Perrault ....................... 18/2

Primary Examiner—J. Spencer Overholser
Assistant Examiner—DeWalden W. Jones
Attorney—Waters, Roditi & Schwartz ABSTRACT: A device to facilitate removal of asbestos-cement pipes from a mandrel in a plant for manufacture of such pipes, and comprising two single-arm levers hinged to each other and to an upright. The free end of the lever which is not connected to the upright is provided with a needle, which is essentially a double-arm lever, and a roller whose axes of turning and rotation are respectively aligned one with the other. The inoperative end of the needle is connected to the joint connecting the levers with the upright through the intermediary of springs. Hinged to said upright is a power cylinder capable of turning in the plane of movement of the levers. The cylinder is hinged to a lever abutting the upright, and imparts motion to the levers. The levers moving, the roller rolls over a cam which is essentially a mandrel on which said asbestos-cement pipe is formed.

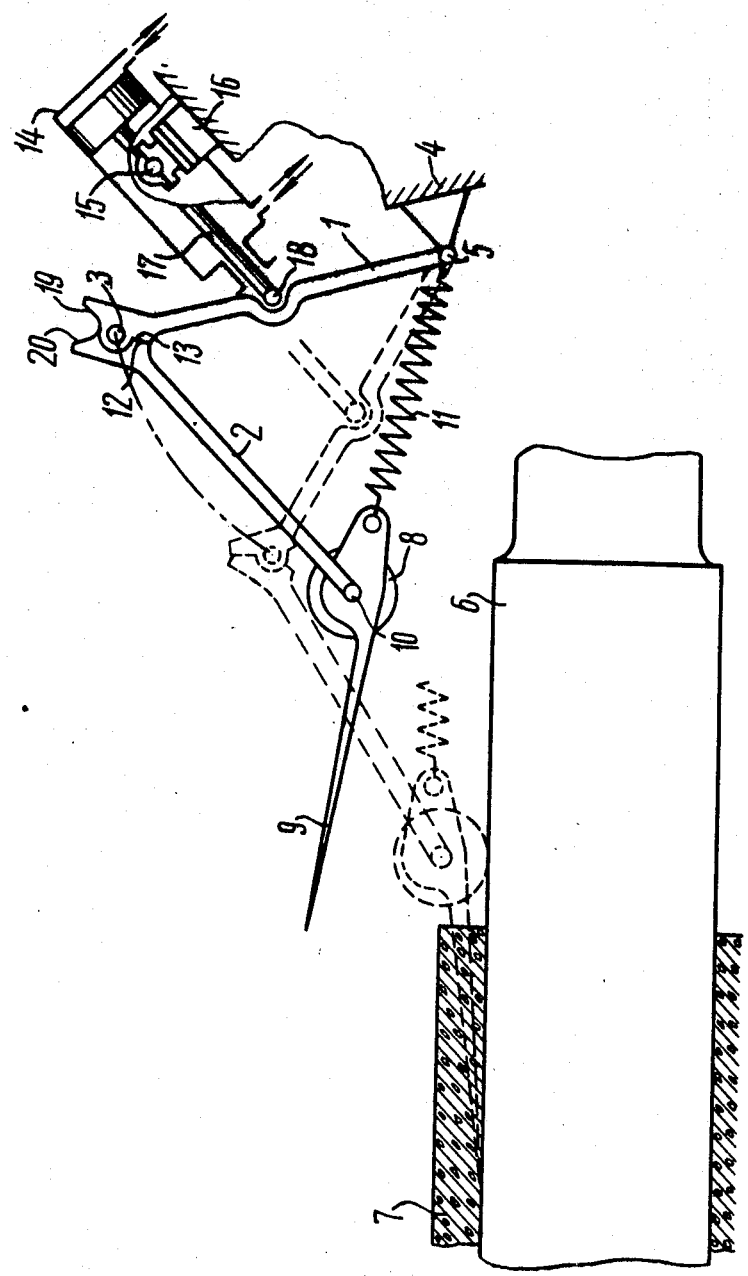

DEVICE TO FACILITATE REMOVAL OF ASBESTOS-CEMENT PIPES FROM THE MANDREL IN A PLANT FOR MANUFACTURE OF SUCH PIPES

The present invention relates to plants for manufacture of asbestos-cement pipes and, more particularly, to devices designed to facilitate removal of asbestos-cement pipes from mandrels in plants used for manufacture of such pipes.

Widely known in the prior art are devices which comprise two interconnected power cylinders disposed perpendicular relative each other, one of said cylinders being arranged parallel with respect to the longitudinal axis of the calender of the plant for manufacture of pipes, mounted in guides and rigidly connected to a needle. A pipe, whose layers are wound in a press unit on a mandrel, is delivered into the calender together with the mandrel and is positioned between two devices designed to facilitate removal of the pipe from the mandrel. Then power cylinders arranged perpendicular to the calender longitudinal axis are actuated to displace the power cylinders with needles along the guides until the needles contact the ends of the mandrel, whereupon the power cylinders connected with the needles are switched on. The rods of these cylinders move along other guides arranged perpendicular to the above-mentioned guides and the needles start loosening the pipe from the mandrel, whereupon the devices are brought back to their initial positions. Then the pipe is rolled out, as a result of which the air to be found in gaps formed by said devices is distributed between the inner face of the pipe and the outer face of the mandrel, thus providing conditions for a relatively easy removal of the pipe from the mandrel, to be effected by a subsequent mechanism of the plant for manufacture of pipes, i.e., the mechanism for removal of pipes from the mandrel. Sometimes, the needle is made hollow and has inlet and outlet holes, the later hole being provided in the operating end of the needle. Supplied to the inlet hole of the needle is compressed air which fills up the gap formed by the needle.

Employment of conventional devices of the aforegoing type is fraught with difficulties lying in that asbestos-cement sets on the guides, thus bringing about frequent failures of the devices. Besides, the use of two power cylinders requires a relatively complex control system.

Attempts have been made to decrease the number of the power cylinders and guides connected therewith. One of the conventional devices comprises two double-arm levers interconnected by a joint and coupled by a spring. The levers are set into motion by a rotating cylindrical cam which has a helical groove interacting with the end of one of the levers, the lever performing an oscillatory motion relative a fixed axis of turning. The other lever has a movable axis of turning which is aligned with the axis of rotation of a roller mounted on this same lever and interacting with a stationary cam, the roller being pressed against the cam by the spring coupling the levers. In addition, the latter lever is rigidly connected to a needle performing a complex motion determined by the shape of the two cams. The cylindrical cam is connected to an appropriate rotating part of the plant for manufacture of pipes and is in continuous rotation. The arrangement employs no power cylinders.

However, said arrangement also has disadvantages stemming from the complexity of the gearing diagram and presence of frictional parts subject to clogging with asbestos-cement.

Besides, all the conventional devices have a common disadvantage lying in the complexity of their readjustment to be performed when manufacturing pipes of various diameters.

The present invention is aimed at the provision of a novel device free of the aforementioned disadvantages.

This aim is attained in a device designed to facilitate removal of asbestos-cement pipes from the mandrel and comprising two interhinged levers interconnected by a spring, the path of said levers being defined to a certain extent by a cam plate, on which a roller rolls connected to said levers; one of said levers is connected to the needle. In accordance with the present invention the levers are made single armed. One of said levers, hinged to an upright, is hinged to a power cylinder mounted with a possibility of turning relative a stationary axis in the plane of the levers' motion. The free end of the other lever has a needle pivoted thereon and fashioned as a double-arm lever whose axis of turning is aligned with the axis of rotation of a roller mounted on the same end of said lever. One end of the spring is connected to the inoperative end of the needle and the other end to the joint connecting the levers with the upright. The cam plate on which the roller rolls is essentially the mandrel on which an asbestos-cement pipe is formed. When manufacturing pipes of various diameters, the upright is to be rearranged.

The present invention makes it possible to dispense with complex cam plates and guides subject to clogging with asbestos-cement and to considerably simplify readjustment of the device when manufacturing pipes of various diameters.

In the preferred embodiment of the device according to the present invention the ends of the levers are provided with stops disposed at the joint interconnecting the levers and limiting the turn of the latter relative each other, presetting in this way the extreme positions of the device as a whole.

The substantial advantage of the present invention over the prior art lies in the fact that it provides for a reliable operation of the plant for manufacture of asbestos-cement pipes when producing pipes of various diameters.

The following detailed description of a preferred embodiment of a device designed to facilitate removal of asbestos-cement pipes from the mandrel in a plant for manufacture of such pipes, according to the invention, is illustrated by an accompanying drawing showing a basic diagram of said arrangement.

The device comprises two single-arm levers 1 and 2 interconnected by a cylindrical joint 3. Said leverage is connected to an upright 4 by means of another cylindrical joint 5, the axes of turning of the joints 3 and 5 being arranged perpendicular to the longitudinal axis of a mandrel 6 on which an asbestos-cement pipe 7 is formed. The lever 2 has a roller 8 and a needle 9 disposed on the free end thereof, said needle 9 being essentially a double-arm lever. The roller 8 and the needle 9 are mounted on a common axle 10 whose geometrical axis is parallel to the axes of turning of the joints 3 and 5, the inoperative end of the needle 9 being connected by means of a spring 11 to the joint 5.

The spring 11 tends all the time to bring the needle 9 close to the joint 5, however, stops 12 and 13 fashioned as bevels provided on the ends of the levers limit the degree of turning of the levers 1 and 2 relative each other when the device is in the nonoperative position.

The levers 1 and 2 are set into the operative position by means of a hydraulic power cylinder 14 mounted in the plane of movement of the levers 1 and 2 capable of turning round a stationary axis, for which purpose the power cylinder 14 is provided with journals 15 whose longitudinal axes are parallel to the axes of turning of the joints 3 and 5. The journals 15 are mounted in bearings 16 arranged on the upright 4. The rod 17 of the power cylinder 14 is connected by means of a joint 18 to the middle portion of the lever 1.

The rod 17 being extended, the lever 1 turns relative the axis of turning of the joint 5, the end of said lever performing a motion along a circumference shown in the drawing by the dash-and-dot line. At this moment, the other lever 2 does not change its position relative the lever 1 until the roller 8 touches the mandrel 6.

The device of the invention envisages the use of the mandrel 6 as a guide for the leverage 1, 2. The roller 8 rolls along the mandrel 6, and the lever 2 starts turning, as a result of which the angle between the levers 1 and 2 increases. The spring 11 extends, and the pointed (operative) end of the needle 9 moves down and towards the asbestos-cement pipe 7. On reaching the pipe butt face, the needle is wedged in between the inner face of the pipe 7 and the outer face of the mandrel 6.

The extreme operating position of the needle 9 (shown by the dotted line) is defined by stops 19 and 20 which are essentially bevels provided on the end portions of the levers 1 and 2.

Thereupon, the power cylinder 14 is switched over and the rod 17 is pushed inside the cylinder, thus bringing the leverage to its initial position.

The pipe 7 is rolled out and together with the mandrel 6 is supplied into the mechanism (not shown in the drawing) for removal of the pipe from the mandrel.

To manufacture a pipe whose diameter differs from that of a preceding one, the upright 4 is rearranged for a required distance, whereupon the device is ready for operation.

The present invention may be realized in the following manner:

A device as claimed in the subject of the invention, in which the ends of said levers are provided with stops disposed at the joint interconnecting the levers and limiting the turn of one of the latter relative the other.

I claim:

1. A device to facilitate removal of asbestos-cement pipes from the mandrel in a plant for manufacture of such pipes, comprising two single-arm levers hinged to each other; the first of said levers being hinged to an upright; a needle which is essentially a double-arm lever hinged to the free end of the other of said levers; a roller mounted on the same end of said other lever, the axis of rotation of the roller being aligned with the axis of turning of said needle; a spring interconnecting said levers, one end of the spring being connected with the inoperative end of said needle and the other end of the spring being connected to the joint connecting said first lever with said upright; a power cylinder hinged to said first lever and said upright, the joint of the latter connection making it possible for said power cylinder to turn relative the stationary axis of said joint in the plane of movement of said levers; a cam plate on which said roller rolls, said cam plate being essentially said mandrel on which said asbestos-cement pipe is formed.

2. A device as claimed in claim 1, in which the ends of said levers are provided with stops disposed at the joint interconnecting the levers and limiting the turn of one of the latter relative the other.